Sept. 20, 1938.  M. J. CONNERS  2,130,839
OUTLET BOX
Filed March 24, 1936
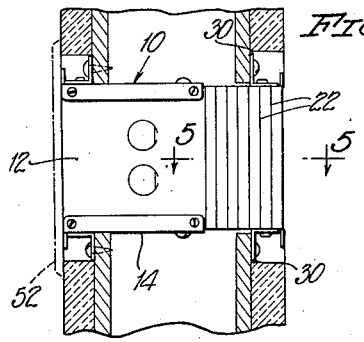
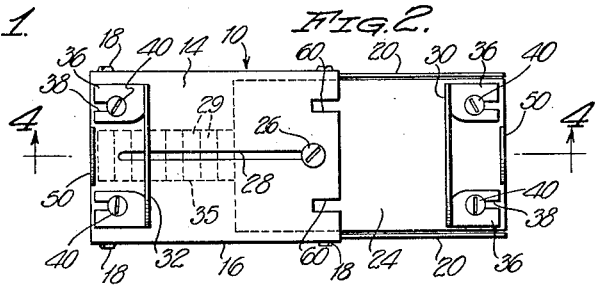
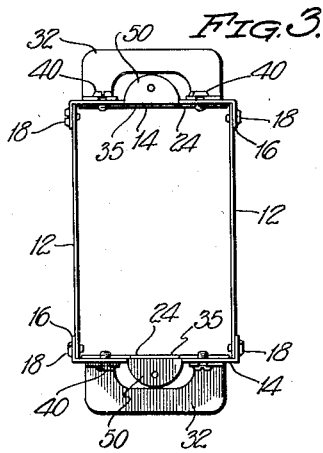
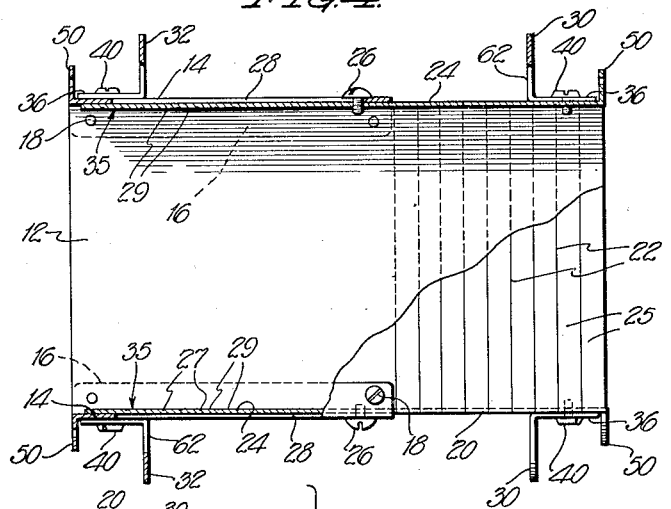
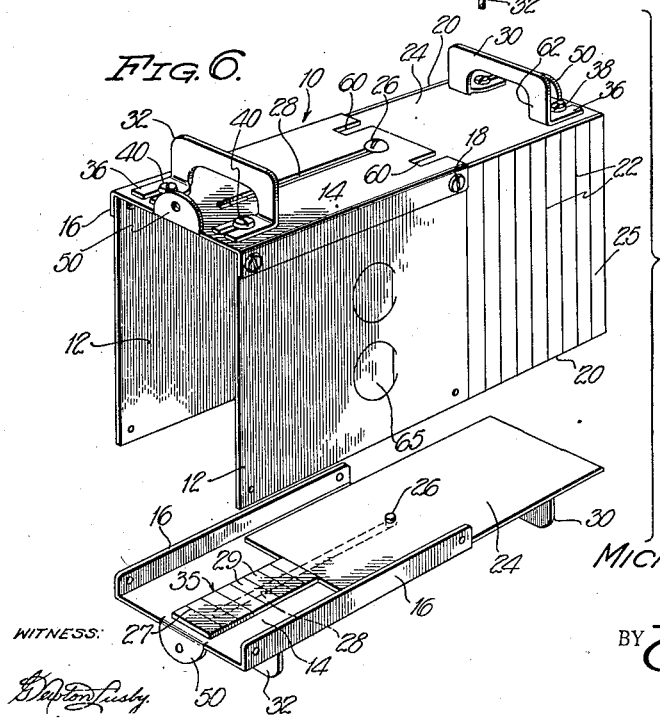
MICHAEL J. CONNERS.
INVENTOR.
BY Ely Pattison
ATTORNEYS.
WITNESS:

Patented Sept. 20, 1938

2,130,839

UNITED STATES PATENT OFFICE 2,130,839

OUTLET BOX

Michael J. Conners, Larchmont, N. Y.

Application March 24, 1936, Serial No. 70,592

6 Claims. (Cl. 247—19)

This invention relates to new and useful improvements in outlet boxes and more particularly it pertains to outlet boxes for electrical conductors.

It is one object of the invention to provide a new and improved construction of so-called double outlet boxes.

A further object of the invention consists in the provision of a new and novel form of outlet box which may be positioned within a wall and open on opposite sides of the said wall.

Walls of buildings are of various thicknesses, and it is, therefore, a further object of this invention so to construct an outlet box of the type afore-mentioned, that it may be adapted to walls of various thicknesses within, of course, the maximum limitations of the box.

Still a further object of the invention resides in a novel construction whereby the box may be adapted to walls of various thicknesses and at the same time provide a neat appearance to receive the facing plate in proper position with respect to the wall, after the box has been adjusted in position.

Other objects of the invention will appear as the nature of the invention is better understood, for which purpose, reference will be had to the following specification, claims and the accompanying drawing, in which;

Figure 1 is a fragmentary sectional view of a wall illustrating an outlet box constructed in accordance with the present invention in position therein, Figure 2 is a top plan view of the box in the position in which it is illustrated in Figure 1 and on a slightly enlarged scale, Figure 3 is an end view in elevation of the box, Figure 4 is a longitudinal sectional view on an enlarged scale taken substantially on the line 4—4 of Figure 2, Figure 5 is a detail sectional view taken substantially on the line 5—5 of Figure 1, and;

Figure 6 is a distended perspective view on an enlarged scale.

An outlet box constructed in accordance with the present invention comprises a main body portion 10. This main body portion consists of side walls 12 opposed to each other in conjunction with side walls 14, which latter are also opposed to each other. The side walls 14 are provided with flanges 16 which are adapted to embrace the edges of the side walls 12, and these several walls 12 and 14 may be secured together by screws or the like 18 to form the rectangular body portion 10.

The side walls 12 of the main body portion 10 are longer than the side walls 14, which construction provides extensions 20 on the side walls 12. These extensions 20 are weakened along predetermined transverse lines 22 to provide removable sections 25.

Slidably carried by the side walls 14 of the main body portion there are plates 24. These plates 24 carry screws or bolts 26 which are operated in slots 28 in the side walls 14, which construction provides means for adjustably connecting the plates to the side walls 14 in such a manner that they will bridge or close the spaces between the extensions 20 of the side walls 12 to form, together with said extensions, an elongated outlet box having closed sides and open ends. These plates 24 are formed with extensions 35 which are transversely scored as at 27 to provide removable sections 29. As illustrated, the extensions 25 of the plates 24 serve to close the slots 28, when the plates are adjusted to extend beyond the box as shown in Figure 4. To prevent projection of the extensions 35 beyond the ends of the box, the desired number of sections 29 may be removed.

Wall engaging means, such as 30, are secured to the sliding plates 24, and similar wall engaging means 32 are carried by the walls 14 of the main body portion 10 of the outlet box. These means may have feet 36 which are slotted as at 38 to receive bolts 40 by which slight adjustment of the members 30 and 32 may be obtained.

Ears or lugs 50 may be provided to which to secure, as illustrated in Figure 1 in dotted lines, the cap or finish plate 52.

This construction operates in the following manner.

The main body portion 10 with the extensions 20 of the side walls 12 thereof, will be made up in predetermined lengths. The box will be fitted to the thickness of the wall in connection with which it is to be used by removing one or more of the sections 25 of the extensions 20 along the predetermined transversely extending weakened lines 22. After this has been done, the screws 26 may be loosened and the plates 24 moved relatively to their respective side walls 14 till their ends are flush with the ends of the extensions 20 after the desired number of sections 25 have been removed. When these ends are all flush the screws 26 may be tightened to retain the plates 24 in their adjusted position. In their adjusted position these plates 24 bridge and close the spaces between the extensions 20 and form an outlet box having closed sides and open ends. When adjusted in position, the members 30 and 32 will engage the wall, as illustrated in Figure 1, to retain the outlet boxes in position and the cap or finish plates 52 are then positioned in the ordinary manner.

From the foregoing it will be apparent that the present invention provides a new and improved construction in outlet boxes whereby the box may be adjusted to walls of various thicknesses within limitations, of course, and that the box may be securely held in position when in the wall.

The walls 14 may be provided with slots or the like 60 to receive the vertical portions 62 of the wall engaging members 30 when it becomes necessary to remove all of the weakened sections 25 in order that the outer ends of the plates 24 may occupy a position substantially flush with their adjacent or corresponding ends of the walls 14.

As is the common practice, the side walls may be provided with knockouts 65 at any desired location, this latter, however, being a common practice in the art.

While the invention has been herein illustrated in its preferred form, it is to be understood that it is not to be limited to the specific construction herein shown and that it may be practiced in other forms without departing from the spirit of the appended claims.

Having thus described the invention, what is claimed as new, is:

1. An outlet box comprising a main body portion, extensions projecting from two opposed sides of said main body portion, said extensions being weakened along predetermined transverse lines whereby portions thereof may be removed, and means slidably mounted upon the remaining side walls of the main body portion to bridge and close the spaces between said extensions.

2. An outlet box comprising a main body portion, extensions projecting from two opposed sides of said main body portion, said extensions being weakened along predetermined transverse lines whereby portions thereof may be removed, and means adjustably carried by the remaining side walls of the main body portion to bridge and close the spaces between said extensions, said last mentioned means comprising plates slidably connected to opposed side walls of the main body portion.

3. An outlet box comprising a main body portion, extensions projecting from two opposed sides of said main body portion, said extensions being weakened along predetermined transverse lines whereby portions thereof may be removed, slidably mounted plates carried by the remaining opposed sides of said main body portion, and means for adjustably securing said extension plates to their respective side walls of the main body portion substantially as described.

4. An outlet box comprising a main body portion, extensions projecting from two opposed sides of said main body portion, said extensions being weakened along predetermined transverse lines whereby portions thereof may be removed, extensible plates adjustably carried by the main body portion and adapted to bridge the spaces between the afore-mentioned extensions, means for adjustably securing said extensible plates to the main body portion, and wall engaging means carried by said main body portion and said extensible plates.

5. An outlet box comprising a main body portion, extensions projecting from two opposed sides of said main body portion, said extensions being weakened along predetermined transverse lines whereby portions thereof may be removed, elongated slots in the opposite shorter walls of said box, extension plates carried by said opposed short walls of the box, screws carried by said plates, said screws being slidable in said slots to provide adjustment thereof relative to the opposite side wall extensions, and means carried by said plates to overlie the afore-mentioned slots and close the same.

6. An outlet box comprising a main body portion, extensions projecting from two opposed sides of said main body portion, said extensions being weakened along predetermined transverse lines whereby portions thereof may be removed, elongated slots in the opposite shorter walls of said box, extension plates carried by said opposed short walls of the box, screws carried by said plates, said screws being slidable in said slots to provide adjustment thereof relative to the opposite side wall extensions, and means carried by said plates to overlie the afore-mentioned slots and close the same, said last mentioned means comprising extensions which are transversely weakened to provide removable sections.

MICHAEL J. CONNERS.